United States Patent [19]

Richard et al.

[11] Patent Number: 5,736,063
[45] Date of Patent: Apr. 7, 1998

[54] NON-AZEOTROPIC REFRIGERANT COMPOSITIONS CONTAINING CARBON DIOXIDE

[75] Inventors: Robert Gerard Richard, Cheektowaga; Ian R. Shankland; Rajiv Ratna Singh, both of Williamsville, all of N.Y.

[73] Assignee: AlliedSignal Inc., Morris Township, N.J.

[21] Appl. No.: 736,613

[22] Filed: Oct. 24, 1996

Related U.S. Application Data

[60] Continuation of Ser. No. 452,231, May 26, 1995, abandoned, which is a division of Ser. No. 895,254, Jun. 8, 1992, abandoned, which is a continuation of Ser. No. 671,270, Mar. 18, 1991, abandoned.

[51] Int. Cl.$^6$ ..................................................... C09K 5/04
[52] U.S. Cl. ................................................ 252/67; 62/114
[58] Field of Search ................................ 252/67; 62/114; 264/DIG. 5

[56] References Cited

U.S. PATENT DOCUMENTS

| | | | |
|---|---|---|---|
| 3,640,869 | 2/1972 | Orfeo et al. | 252/67 |
| 4,495,776 | 1/1985 | Nikolsky et al. | 62/114 |
| 4,603,002 | 7/1986 | Nikolsky et al. | 252/67 |
| 4,810,403 | 3/1989 | Bivens et al. | 252/67 |
| 5,162,381 | 11/1992 | Richard et al. | 521/89 |
| 5,169,873 | 12/1992 | Behme et al. | 521/114 |
| 5,185,094 | 2/1993 | Shiflett | 252/67 |
| 5,370,811 | 12/1994 | Yoshida et al. | 252/67 |
| 5,403,504 | 4/1995 | Bivens et al. | 252/67 |

FOREIGN PATENT DOCUMENTS

| | | |
|---|---|---|
| 0406206 | 1/1991 | European Pat. Off. . |
| 0 430 169 | 6/1991 | European Pat. Off. . |
| 0 430 170 | 6/1991 | European Pat. Off. . |
| 0 430 171 | 6/1991 | European Pat. Off. . |
| 4116274 | 11/1992 | Germany . |
| 43-29125 | 12/1968 | Japan . |
| 59-117580 | 7/1984 | Japan . |
| 61-142744 | 6/1986 | Japan . |
| 64-79288 | 3/1989 | Japan . |
| 2-272086 | 11/1990 | Japan . |
| 3170591 | 7/1991 | Japan . |
| 3170594 | 7/1991 | Japan . |
| 4014719 | 3/1992 | Japan . |
| 59-117580 | 7/1994 | Japan . |
| 6-220435 | 8/1994 | Japan . |
| 90/08754 | 8/1990 | WIPO . |
| 9318110 | 9/1993 | WIPO . |

*Primary Examiner*—Christine Skane
*Attorney, Agent, or Firm*—Lois A. Gianneschi

[57] ABSTRACT

The present invention provides refrigerant blends which are replacements for chlorodifluoromethane(HCFC-22). The present blends have refrigeration characteristics which are similar to HCFC-22. The blends comprise from about 10 to about 90 weight percent of a first component selected from the group consisting of 1,1,1-trifluoroethane, difluoromethane, propane, and mixtures thereof; from about 1 to about 50 weight percent of a second component selected from the group consisting of hydrofluorocarbon having 1 to 3 carbon atoms, fluorocarbon having 1 to 3 carbon atoms, inorganic compound, and mixtures thereof having a boiling point at atmospheric pressure in the range from about −90 degrees C. to less than −50 degrees C.; and from about 1 to about 50 weight percent of a third component which is hydrofluorocarbon having 1 to 3 carbon atoms, other than 1,1,1-trifluoroethane, having a boiling point at atmospheric pressure in the range from about −50 degrees C. to about −10 degrees C. The refrigerant compositions have a vapor pressure substantially equal to the vapor pressure of HCFC-22.

5 Claims, 1 Drawing Sheet

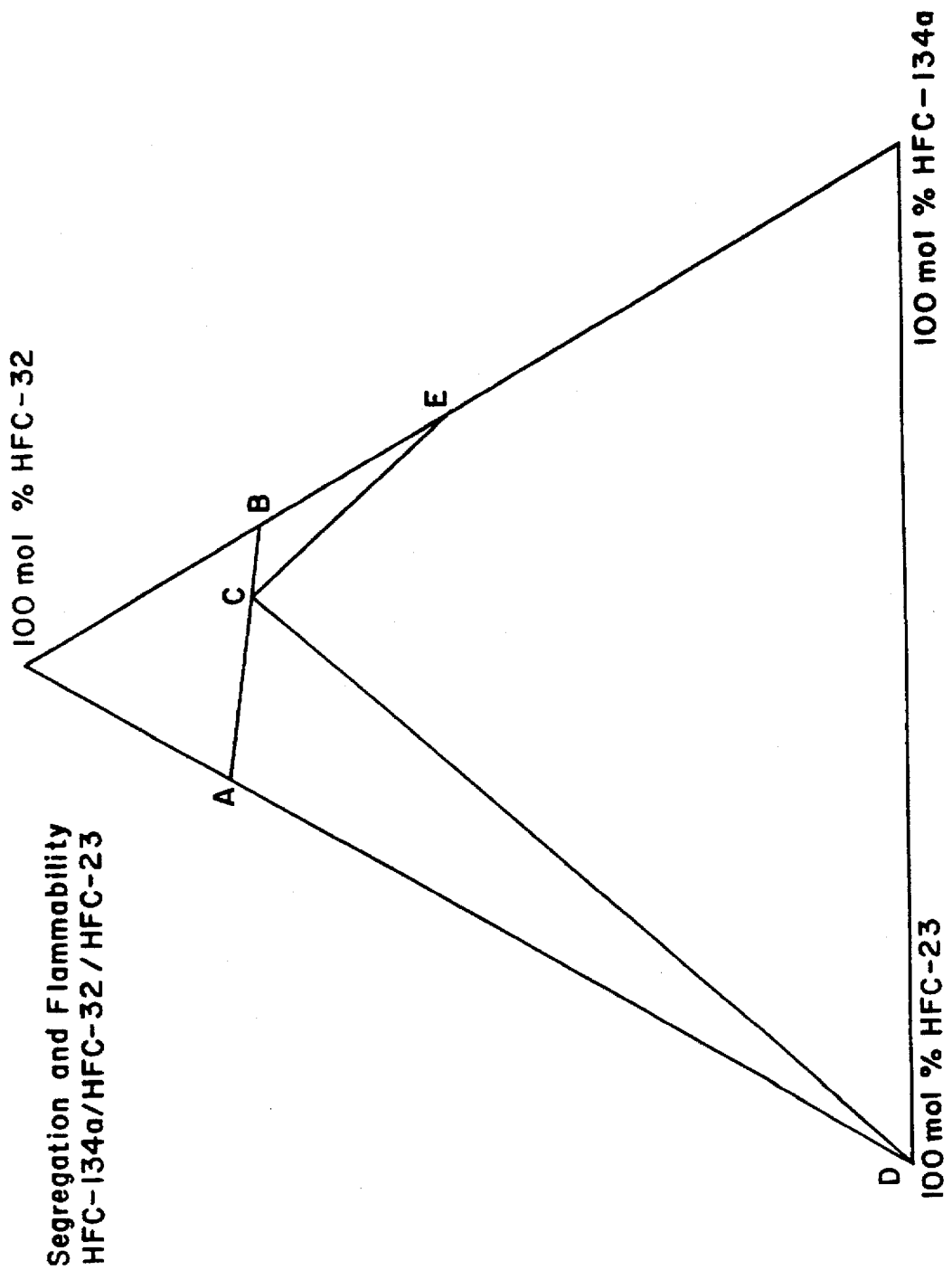

NON-AZEOTROPIC REFRIGERANT COMPOSITIONS CONTAINING CARBON DIOXIDE

This application is a continuation of U.S. patent application Ser. No. 08/452,231 filed May 26, 1995 now abandoned, which in turn is a division of application Ser. No. 07/895,254, filed Jun. 8, 1992 now abandoned which in turn is a continuation of application Ser. No. 07/671,270 filed Mar. 18, 1991 now abandoned.

FIELD OF THE INVENTION

This invention relates to novel nonazeotropic compositions containing difluoromethane; 1,1,1-trifluoroethane; or propane. These mixtures have improved efficiency and capacity as refrigerants for heating and cooling.

BACKGROUND OF THE INVENTION

Fluorocarbon based fluids have found widespread use in industry for refrigeration, air conditioning and heat pump applications. Vapor compressions cycles are one form of refrigeration. In its simplest form, the vapor compression cycle involves changing the refrigerant from the liquid to the vapor phase through heat absorption at a low pressure, and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes the refrigerant to vaporize. The formed vapor is then removed by means of a compressor in order to maintain the low pressure in the evaporator. The temperature and pressure of the vapor are then raised through the addition of mechanical energy by the compressor. The high pressure vapor then passes to the condenser whereupon heat exchange with a cooler medium, the sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluorocarbons have gained widespread use in refrigeration applications including air conditioning and heat pump applications owing to their unique combination of chemical and physical properties. The majority of refrigerants utilized in vapor compression systems are either single component fluids or azeotropic mixtures.

The majority of refrigerants utilized in vapor compression systems are either single component fluids or azeotropic mixtures. The latter are binary mixtures, but for all refrigeration purposes behave as single component fluids. Non-azeotropic mixtures have been disclosed as refrigerants for example in U.S. Pat. Nos. 4,303,536 and 4,810,403 but have not yet found widespread use in commercial applications.

The condensation and evaporation temperatures of single component fluids are defined clearly. If we ignore the small pressure drops in the refrigerant lines, the condensation or evaporation occurs at a single temperature corresponding to the condenser or evaporation pressure. For mixtures being employed as refrigerants, there is no single phase change temperature but a range of temperatures. This range is governed by the vapor-liquid equilibrium behavior of the mixture. This property of mixtures is responsible for the fact that when nonazeotropic mixtures are used in the refrigeration cycle, the temperature in the condenser or the evaporator has no longer a single uniform value, even if the pressure drop effect is ignored. Instead, the temperature varies across the equipment, regardless of the pressure drop. In the art, this variation in the temperature across an equipment is known as temperature glide.

It has been pointed out in the past that for non-isothermal heat sources and heat sinks, this temperature glide in mixtures can be utilized to provide better efficiencies. However in order to benefit from this effect, the conventional refrigeration cycle has to be redesigned, see for example T. Atwood, "NARBs-The Promise and the Problem", paper 86-WA/HT-61 American Society of Mechancial Engineers. In most existing designs of refrigeration equipment, a temperature glide is a cause of concern. Therefore, nonazeotropic refrigerant mixtures have not found wide use. An environmentally acceptable nonazeotropic mixture with a small temperature glide and with an advantage in refrigeration capacity over other known pure fluids will have a general commercial interest.

Chlorodifluoromethane (HCFC-22) is a currently used refrigerant. Although HCFC-22 is only partially halogenated, it still contains chlorine and hence has a propensity for ozone depletion. What is needed in the refrigerant art is a replacement for HCFC-22 which has similar refrigeration characteristics, is nonflammable, has low temperature guides, and contains no ozone-depleting chlorine atoms.

U.S. Pat. No. 4,810,403 teaches ternary or higher blends of halocarbon refrigerants which are substitutes for dichlorodifluoromethane (CFC-12). The blends have a first component which has a boiling point at atmospheric pressure in the range of −50 degrees C. to −30 degrees C., a second component which has a boiling point at atmospheric pressure in the range of −30 degrees C. to −5 degrees C., and a third component which has a boiling point at atmospheric pressure in the range of −15 degrees C. to 30 degrees C. The preferred blend contains chlorodifluoromethane (HCFC-22), 1,1-difluoroethane (HFC-152a), and 1,2-dichloro-1,1,2,2-tetrafluoroethane (CFC-114). As the reference lists HCFC-22 as a possible refrigerant component, the reference is not teaching refrigerant substitutes for HCFC-22.

As such, the art is seeking new fluorocarbon based mixtures which offer alternatives for HCFC-22 in refrigeration and heat pump applications. Currently, of particular interest, are fluorocarbon based mixtures which are considered to be environmentally acceptable substitutes for the presently used hydrochlorofluorocarbons which are suspected of causing environmental problems in connection with the earth's protective ozone layer. Mathematical models have substantiated that hydrofluorocarbons, such as 1,1,1-trifluoroethane (HFC-143a) or difluoromethane (HFC-32) will not adversely affect atmospheric chemistry, being negligible contributors to stratospheric ozone depletion and global warming.

The substitute materials must also possess those properties unique to the CFC's including chemical stability, low toxicity, non-flammability, and efficiency in-use. The latter characteristic is important, for example, in air conditioning and refrigeration where a loss in refrigerant thermodynamic performance or energy efficiency may have secondary environmental impacts through increased fossil fuel usage arising from an increased demand for electrical energy.

The aforementioned environmentally acceptable refrigerants HFC-32 and HFC-143a are flammable which may limit their general use. These refrigerants are generally regarded as too low boiling fluids to directly replace chlorodifluoromethane (HCFC-22).

In order to overcome the flammability of HFC-32, we blended HFC-32 with 1,1,1,2-tetrafluoroethane (HFC-134a) and the result was zero ozone depletion potential compositions which are useful substitutes for HCFC-22. At high amounts of HFC-32 though, compositions of HFC-32 and HFC-134a are flammable. In order to completely eliminate the flammability of such compositions, we decided to add a third nonflammable component. In adding a third component, we wanted the resulting ternary composition to have a zero ozone depletion potential and have a boiling point comparable to that of HCFC-22. One member from the list of compounds having zero ozone depletion potential and boiling points at atmospheric pressure in the range of −90 degrees C. to −60 degrees C. is trifluoromethane (HFC-23) which has a low critical temperature; as those skilled in the art know, compounds having low critical temperatures are not used as refrigerants because they do not condense at room temperature and in a refrigerant blend, would be expected to substantially reduce the refrigeration efficiency and capacity of the blend. We were pleasantly surprised to find that in addition to being nonflammable, a blend of HFC-32, HFC-134a, and HFC-23 has refrigeration efficiency and capacity substantially the same as a blend of HFC-32 and HFC-134a.

SUMMARY OF THE INVENTION

Thus, we have discovered refrigerant blends which are substitutes for HCFC-22. These nonazeotropic refrigerant compositions comprise from about 10 to about 90 weight percent of a first component selected from the group consisting of 1,1,1-trifluoroethane (HFC-143a), difluoromethane (HFC-32), propane, and mixtures thereof; from about 1 to about 50 weight percent of a second component selected from the group consisting of hydrofluorocarbon having 1 to 3 carbon atoms, fluorocarbon having 1 to 3 carbon atoms, inorganic compound, and mixtures thereof having a boiling point at atmospheric pressure in the range from about −90 degrees C. to less than −50 degrees C.; and from about 1 to about 50 weight percent of a third component which is hydrofluorocarbon having 1 to 3 carbon atoms, other than 1,1,1-trifluoroethane, having a boiling point at atmospheric pressure in the range from about −50 degrees C. to about −10 degrees C. The refrigerant compositions have a vapor pressure substantially equal to the vapor pressure of HCFC-22.

The term "hydrofluorocarbon" as used herein means a compound having carbon, hydrogen, and fluorine atoms. The term "fluorocarbon" as used herein means a compound having carbon and fluorine atoms. For the second component, any hydrofluorocarbon having 1 to 3 carbon atoms, fluorocarbon having 1 to 3 carbon atoms, or inorganic compound having a boiling point at atmospheric pressure in the range from about −90 degrees C. to less than −50 degrees C. may be used in the present invention. For the third component, any hydrofluorocarbon having 1 to 3 carbon atoms, other than 1,1,1-trifluoroethane, having a boiling point at atmospheric pressure in the range from about −50 degrees C. to about −10 degrees C. may be used in the present invention.

The preferred first component is difluoromethane.

Preferably, the second component is selected from the group consisting of: trifluoromethane (HFC-23), hexafluoroethane (FC-116), carbon dioxide or sulphur hexafluoride. The preferred second component is trifluoromethane. All members listed for the second component are nonflammable and generally boil at a temperature below that of HFC-32 or HFC-143a.

Preferably, the third component is selected from the group consisting of: pentafluoroethane (HFC-125), 1,1,2,2-tetrafluoroethane (HFC-134), 1,1,1,2-tetrafluoroethane (HFC-134a), 1,1,1,2,3,3,3-heptafluoropropane (HFC-227ea), 1,1,1,2,2,3,3-heptafluoropropane (HFC-227ca), or 1,1,1,2,2-pentafluoropropane (HFC-245cb). The preferred third component is 1,1,1,2-tetrafluoroethane. All members listed for the third component are nonflammable and generally boil at a temperature above that of HFC-32 or HFC-143a.

Small quantities of HFC-227ea, HFC-227ca, and HFC-245cb are available from PCR and Halocarbon Products. All other components of the present invention are available in commercial quantities. Also, HFC-227ea, HFC-227ca, and HFC-245cb may be prepared according to known methods such as those disclosed in International Publication Number WO 90/08754. For example, HFC-227ca may be prepared by reacting 1,1,1,3,3-pentachloro-2,2-difluoropropane with niobium pentachloride at 120 degrees C. HFC-245cb may be prepared by reacting 1,1,1,2,2-pentachloropropane with tantalum pentafluoride at 120 degrees C.

By "vapor pressure substantially equal to the vapor pressure of chlorodifluoromethane" or "similar refrigeration characteristics" is meant a vapor pressure which is plus or minus 30 percent of the vapor pressure of HCFC-22 at the same temperature over the temperature range of about 0 degrees C. to about 100 degrees C.

Additional components may be added to the mixture to tailor the properties of the mixture according to the need.

Other advantages of the invention will become apparent from the following description.

DESCRIPTION OF THE DRAWING

The Figure illustrates nonflammable compositions of the present invention.

DETAILED DESCRIPTION OF THE INVENTION

The properties of the preferred components of the present invention are listed in Table 1 below. BP in Table 1 stands for Boiling Point while CT stands for Critical Temperature. The * in Table 1 means sublimes at one atm pressure and the boiling point is the triple point.

TABLE 1

| No. | Formula | BP (degrees C.) | CT (degrees C.) |
|---|---|---|---|
| HFC-32 | $CH_2F_2$ | −51.7 | 78.4 |
| HFC-143a | $CF_3CH_3$ | −47.6 | 73.1 |
| Propane | $C_3H_8$ | −42.1 | 96.7 |
| HFC-23 | $CHF_3$ | −82.1 | 25.9 |
| FC-116 | $C_2F_6$ | −78.1 | 24.3 |
| — | $CO_2$* | −78.5 | 31.3 |
| — | $SF_6$ | −64.0 | 45.5 |
| HFC-125 | $C_2HF_5$ | −48.5 | 66.3 |
| HFC-134 | $CHF_2CHF_2$ | −19.7 | 118.9 |
| HFC-134a | $CF_3CH_2F$ | −26.5 | 101.1 |
| HFC-227ea | $CF_3CFHCF_3$ | −16.5 | 102.0 |
| HFC-227ca | $CF_3CF_2CHF_2$ | −15.6 | 104.7 |
| HFC-245cb | $CF_3CF_2CH_3$ | −17.5 | 107.0 |

The most preferred composition comprises difluoromethane, trifluoromethane, and 1,1,1,2-tetrafluoroethane.

In a preferred embodiment of the invention, the compositions comprise from about 20 to about 80 weight percent of the first component, from about 2 to about 40 weight percent of the second component, and from about 2 to about 40 weight percent of the third component.

In one process embodiment of the invention, the compositions of the invention may be used in a method for producing refrigeration which involves condensing a refrigerant comprising the compositions and thereafter evaporating the refrigerant in the vicinity of the body to be cooled.

In another process embodiment of the invention, the compositions of the invention may be used in a method for producing heating which involves condensing a refrigerant comprising the compositions in the vicinity of the body to be heated and thereafter evaporating the refrigerant.

Preferably the components used should be of sufficiently high purity so as to avoid the introduction of adverse influences upon the properties of the system.

As mentioned above, when a refrigerant composition contains a flammable component like HFC-32, HFC-143a, or propane, the possibility of either the leaking vapor or the remaining liquid becoming flammable is a very undesirable hazard. We have discovered that the claimed compositions of the refrigerant blends containing either HFC-32, HFC-143a, or propane can be so formulated with the components from the two nonflammable groups that the original composition is nonflammable and the leaking vapor as well as the remaining liquid never become flammable.

The present invention comprises ternary and higher blends based either on HFC-32, HFC-143a, or propane that have a vapor pressure substantially the same as the vapor pressure of HCFC-22 and which retain this relationship even after substantial evaporation losses, e.g. up to 50 percent by weight. A vapor pressure temperature relationship similar to HCFC-22 is especially desirable because it will need minimum amount of modifications in the present refrigeration equipment which is designed around the vapor pressure temperature relationship of the HCFC-22.

It should be understood that the present compositions may include additional components so as to form new compositions. Any such compositions are considered to be within the scope of the present invention as long as the compositions have essentially the same characteristics and contain all the essential components described herein.

The present invention is more fully illustrated by the following non-limiting Examples.

EXAMPLES 1–72

The compositions in Table 2 below are made and exhibit refrigeration characteristics similar to HCFC-22, have low temperature guides, and contain no chlorine atoms. Comp 1 stands for the first component, Comp 2 stands for the second component, and Comp 3 stands for the third component.

TABLE 2

| EX | COMP 1 | COMP 2 | COMP 3 |
| --- | --- | --- | --- |
| 1 | HFC-143a | HFC-23 | HFC-125 |
| 2 | HFC-143a | FC-116 | HFC-125 |
| 3 | HFC-143a | $CO_2$ | HFC-125 |
| 4 | HFC-143a | $SF_6$ | HFC-125 |
| 5 | HFC-143a | HFC-23 | HFC-134 |
| 6 | HFC-143a | FC-116 | HFC-134 |
| 7 | HFC-143a | $CO_2$ | HFC-134 |
| 8 | HFC-143a | $SF_6$ | HFC-134 |

TABLE 2-continued

| EX | COMP 1 | COMP 2 | COMP 3 |
| --- | --- | --- | --- |
| 9 | HFC-143a | HFC-23 | HFC-134a |
| 10 | HFC-143a | FC-116 | HFC-134a |
| 11 | HFC-143a | $CO_2$ | HFC-134a |
| 12 | HFC-143a | $SF_6$ | HFC-134a |
| 13 | HFC-143a | HFC-23 | HFC-227ea |
| 14 | HFC-143a | FC-116 | HFC-227ea |
| 15 | HFC-143a | $CO_2$ | HFC-227ea |
| 16 | HFC-143a | $SF_6$ | HFC-227ea |
| 17 | HFC-143a | HFC-23 | HFC-227ca |
| 18 | HFC-143a | FC-116 | HFC-227ca |
| 19 | HFC-143a | $CO_2$ | HFC-227ca |
| 20 | HFC-143a | $SF_6$ | HFC-227ca |
| 21 | HFC-143a | HFC-23 | HFC-245cb |
| 22 | HFC-143a | FC-116 | HFC-245cb |
| 23 | HFC-143a | $CO_2$ | HFC-245cb |
| 24 | HFC-143a | $SF_6$ | HFC-245cb |
| 25 | HFC-32 | HFC-23 | HFC-125 |
| 26 | HFC-32 | FC-116 | HFC-125 |
| 27 | HFC-32 | $CO_2$ | HFC-125 |
| 28 | HFC-32 | $SF_6$ | HFC-125 |
| 29 | HFC-32 | HFC-23 | HFC-134 |
| 30 | HFC-32 | FC-116 | HFC-134 |
| 31 | HFC-32 | $CO_2$ | HFC-134 |
| 32 | HFC-32 | $SF_6$ | HFC-134 |
| 33 | HFC-32 | HFC-23 | HFC-134a |
| 34 | HFC-32 | FC-116 | HFC-134a |
| 35 | HFC-32 | $CO_2$ | HFC-134a |
| 36 | HFC-32 | $SF_6$ | HFC-134a |
| 37 | HFC-32 | HFC-23 | HFC-227ea |
| 38 | HFC-32 | FC-116 | HFC-227ea |
| 39 | HFC-32 | $CO_2$ | HFC-227ea |
| 40 | HFC-32 | $SF_6$ | HFC-227ea |
| 41 | HFC-32 | HFC-23 | HFC-227ca |
| 42 | HFC-32 | FC-116 | HFC-227ca |
| 43 | HFC-32 | $CO_2$ | HFC-227ca |
| 44 | HFC-32 | $SF_6$ | HFC-227ca |
| 45 | HFC-32 | HFC-23 | HFC-245cb |
| 46 | HFC-32 | FC-116 | HFC-245cb |
| 47 | HFC-32 | $CO_2$ | HFC-245cb |
| 48 | HFC-32 | $SF_6$ | HFC-245cb |
| 49 | Propane | HFC-23 | HFC-125 |
| 50 | Propane | FC-116 | HFC-125 |
| 51 | Propane | $CO_2$ | HFC-125 |
| 52 | Propane | $SF_6$ | HFC-125 |
| 53 | Propane | HFC-23 | HFC-134 |
| 54 | Propane | FC-116 | HFC-134 |
| 55 | Propane | $CO_2$ | HFC-134 |
| 56 | Propane | $SF_6$ | HFC-134 |
| 57 | Propane | HFC-23 | HFC-134a |
| 58 | Propane | FC-116 | HFC-134a |
| 59 | Propane | $CO_2$ | HFC-134a |
| 60 | Propane | $SF_6$ | HFC-134a |
| 61 | Propane | HFC-23 | HFC-227ea |
| 62 | Propane | FC-116 | HFC-227ea |
| 63 | Propane | $CO_2$ | HFC-227ea |
| 64 | Propane | $SF_6$ | HFC-227ea |
| 65 | Propane | HFC-23 | HFC-227ca |
| 66 | Propane | FC-116 | HFC-227ca |
| 67 | Propane | $CO_2$ | HFC-227ca |
| 68 | Propane | $SF_6$ | HFC-227ca |
| 69 | Propane | HFC-23 | HFC-245cb |
| 70 | Propane | FC-116 | HFC-245cb |
| 71 | Propane | $CO_2$ | HFC-245cb |
| 72 | Propane | $SF_6$ | HFC-245cb |

EXAMPLE 73

The example shows that it is possible to calculate the thermodynamic properties of a ternary mixture from using equation of state techniques. These are important for estimating theoretical performance of a refrigerant as discussed in Example 75. The equation of state package used was based on the NIST Mixture Properties formalism (DDMIX) available from the National Institute of Standards and Technology, Gaithersberg, Md. 20899. An example of measured and calculated bubble pressures of a 48.1 wt % HFC-23, 19.3 wt % HFC-32, and 32.6 wt % HFC-134a ternary nonazeotropic blend is shown in Table 3. The very good agreement shows the high degree of confidence that may be placed in the results of the experiments and the theory.

TABLE 3

| Temperature/°K. | Bubble Pressure exptl., psia | Bubble Pressure calcd., psia |
| --- | --- | --- |
| 263.54 | 154.2 | 151.8 |
| 268.49 | 176.4 | 174.8 |
| 278.38 | 230.0 | 228.2 |
| 288.09 | 293.4 | 290.9 |
| 298.08 | 367.9 | 366.9 |
| 308.09 | 453.4 | 455.3 |
| 318.12 | 550.7 | 556.1 |

EXAMPLE 74

By preparing various compositions of HFC-134a/HFC-32/HFC-23 in air and determining their flammability, it is possible to map out the region of compositions in air that are flammable. See, e.g. P. A. Sanders, The Handbook of Aerosol Technology at 146 (2d ed. 1979). The maximum amount of HFC-32 that can be blended with HFC-134a and HFC-23 and remain nonflammable in all proportions in air, can be determined from such a plot. Table 4 summaries the maximum or critical composition of HFC-32 attainable with HFC-134a and a higher pressure component (e.g. HFC-23, HF-116, $SF_6$, and $CO_2$) for the binary mixtures. The CFR is the critical flammability ratio: which is the maximum amount of HFC-32 that a mixture of HFC-32/X can contain and still be nonflammable in all proportions in air. X represents the higher pressure components listed in Table 4. These binary flammability data can be used to predict the flammability of the more complex ternary mixture plus air. This complex mixture of three components and air does not lend itself to simple ternary diagrams. Therefore, air is not included so that we are able to show the data graphically. The air proportion itself is not important just whether or not the mixture is flammable in some proportion with air. FIG. 1 shows a composition of HCFC-134a, HFC-32, and HFC-23. Above the line A-B(more HFC-32), mixtures of those compositions are flammable in some proportion in air while below line A-B(less HFC-32), mixtures of those compositions are not flammable in air at any proportion of air. Further this diagram depicts compositions that will remain nonflammable in the event of a vapor leak. If the leak is from the liquid phase, some liquid will vaporize to fill the space vacated by the leaking liquid. Because the vapor is 1/25th as dense as the liquid, and very little vaporization occurs, therefore, very little fractionation occurs. In contrast, when the vapor phase is removed, all the liquid is eventually vaporized, producing a dramatic amount of fractionation. Liquid leaks produce only minor changes in the composition of the mixture. As such, a liquid leak is not problematic and only the case of a vapor leak must be considered.

Shifts in the compositions of the vapor and liquid phases during leaking were calculated using ideal solution behavior. These types of calculations were used to determine what starting compositions would remain nonflammable on evaporation. Line D-C in FIG. 1 separates those compositions that could have flammable liquid phase compositions from those compositions that would remain nonflammable. Compositions rich in HFC-134a (right of the line) would have liquid phase compositions that remain nonflammable on evaporation. Line C-E separates composition that would fractionate given vapors that are flammable from those that would not produce flammable vapors. Compositions having more, HFC-23 (left of the line) would remain nonflammable vapors on segregation. Therefore, compositions below line D-C-E would not fractionate to produce either liquid or vapor phases that could be flammable.

TABLE 4

| Gas in HFC-32 | Maximum HFC-32 Compo (mole or volume %) | % air at CFR (mole or volume %) |
| --- | --- | --- |
| HFC-134a | 72.9 | 20 |
| HFC-23 | 75.3 | 19 |
| HFC-116 | 88.1 | 20 |
| $SF_6$ | 87.9 | 21 |
| $CO_2$ | 55.2 | 29 |

EXAMPLE 75

This example shows that a HFC-32 containing blend has a performance similar to HCFC-22, yet is nonflammable even after substantial vapor leakage.

The theoretical performance of a refrigerant at specific operating conditions can be estimated from the thermodynamic properties of the refrigerant using standard refrigeration cycle analysis techniques, see for example, "Fluorocarbons Refrigerants Handbook", Ch. 3, Prentice-Hall, (1988), by R. C. Downing. The coefficient of performance, COP, is a universally accepted measure, especially useful in representing the relative thermodynamic efficiency of a refrigerant in a specific heating or cooling cycle involving evaporation or condensation of refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power. A similar calculation can also be performed for nonazeotropic refrigerant blends.

We have performed this type of calculation for packaged air conditioning cycle where the condenser temperature is typically 115° F. and the evaporator temperature is typically 40° F. We have further assumed isentropic compression and a compressor inlet temperature of 60° F. Such calculations were performed for a 0.72/28.71/70.57 by weight blend of HFC-23, HFC-32, and HFC-134a. The temperature glide in typical HCFC-22 application in no case exceeded 15° F. The coefficient of performance (COP), a measure of energy efficiency of the fluid, was found to be 5.36 as compared to 5.51 found for HCFC-22 in the same conditions. According to the known art (D. A. Didion and D. M. Bivens "The Role of Refrigerant Mixtures as Alternatives" in CFC's: Today's Options . . . Tomorrow's Solutions, NIST, 1990), the temperature glides of the order of 10° F. are minor enough for the mixture to be termed Near-Azeotropic. Therefore, the temperature glide of the mixture composition claimed is small enough and does not pose a problem for conventional refrigeration units. As can be seen from the attached FIG. 1, which gives the flammability limits of the three component blend of HFC-23, HFC-32, and HFC-134a measured by an ASTM 681 apparatus, the blend is nonflammable. Its vapor pressure is 11.37 bars at 25° C. within 10 percent of the HCFC-22 vapor pressure. The refrigeration capacity is about 95% of the HCFC-22. After 50 weight percent of the refrigerant is lost through the leakage of the vapor, the vapor pressure of the blend is 9.44 bars, still within 10% of the HCFC-22 value. The refrigeration capacity has decreased to only 83% of the HCFC-22 value. The COP of the remaining fluid remained substantially the same at 5.37. Both the vapor at 46 volume percent HFC-32 and the liquid at 28 volume percent HFC-32 has remained nonflammable as seen from FIG. 1.

EXAMPLE 76

We have performed another calculation of the type given in Example 75 for packaged air conditioning cycle where the condenser temperature is typically 115° F. and the evaporator temperature is typically 40° F. We have further assumed isentropic compression and a compressor inlet temperature of 60° F. This time such calculations were performed for a 77.56 gram blend of 0.0384 moles of HFC-23, 0.4648 moles of HFC-32, and 0.4968 moles of HFC-134a. The temperature glide in typical HCFC-22 application in no case exceeded 17° F. As can be seen from the attached FIG. 1, which gives the flammability limits of the three component blend of HFC-23, HFC-32, and HFC-134a measured by an ASTM 681 apparatus, the blend is nonflammable. Its vapor pressure is 12.43 bars at 25° C. within 25 percent of the HCFC-22 vapor pressure. The refrigeration capacity is substantially the same as the HCFC-22. The COP was 5.13. After 50 weight percent of the refrigerant is lost through the leakage of the vapor, the vapor pressure of the blend is 10.08 bars, within 2% of the HCFC-22 value. The refrigeration capacity has decreased to only 87% of the HCFC-22 value. The COP has increased marginally to 5.35. Both the vapor at 51 volume percent HFC-32 and the liquid at 33 volume percent HFC-32 has remained nonflammable as seen from FIG. 1.

EXAMPLE 77

We have performed another calculation of the type given in Examples 75 and 76 under the conditions given earlier. This time such calculations were performed for a 75.62 gram blend of 0.0651 moles of HFC-23, 0.4865 moles of HFC-32, and 0.4484 moles of HFC-134a. The temperature glide in typical HCFC-22 application in no case exceeded 20° F. As can be seen from the attached FIG. 1, which gives the flammability limits of the three component blend of HFC-23, HFC-32, and HFC-134a measured by an ASTM 681 apparatus, the blend is nonflammable. Its vapor pressure is 13.38 bars at 25° C. within 30 percent of the HCFC-22 vapor pressure. The refrigeration capacity is substantially the same as the HCFC-22. The COP is 5.02. After 50 weight percent of the refrigerant is lost through the leakage of the vapor, the vapor pressure of the blend is 10.78 bars, within 4% of the HCFC-22 value. The refrigeration capacity has decreased to only 91% of the HCFC-22 value. The COP is now 5.31. Both the vapor at 54 volume percent HFC-32 and the liquid at 37 volume percent HFC-32 has remained nonflammable as seen from FIG. 1.

Having described the invention in detail and by reference to preferred embodiments thereof, it will be apparent that modifications and variations are possible without departing from the scope of the invention defined by the claims.

What is claimed is:

1. Refrigerant compositions comprising from about 10 to about 90 weight percent of difluoromethane; from about 1 to about 50 weight percent of carbon dioxide; and from about 1 to about 50 weight percent of a hydrofluorocarbon selected from the group consisting of pentafluoroethane, 1,1,1,2,3,3,3-heptafluoropropane, 1,1,1,2,2,3,3-heptafluoropropane, or 1,1,1,2,2-pentafluoropropane, wherein said refrigerant compositions have a vapor pressure substantially equal to the vapor pressure of chlorodifluoromethane.

2. The refrigerant compositions of claim 1 wherein said first, second, and third components and their weight percents are selected so that the resulting refrigerant compositions are nonflammable.

3. The refrigerant compositions of claim 1 consisting essentially of from about 20 to about 80 weight percent said difluoromethane, from about 2 to about 40 weight percent said carbon dioxide, and from about 2 to about 40 weight percent said hydrofluorocarbon.

4. A method for producing refrigeration which comprises condensing said refrigerant compositions of claim 1 and thereafter evaporating said refrigerant compositions in the vicinity of the body to be cooled.

5. A method for producing heating which comprises condensing said refrigerant compositions of claim 1 in the vicinity of the body to be heated and thereafter evaporating said refrigerant compositions.

* * * * *